United States Patent
Takezawa et al.

(10) Patent No.: US 9,138,807 B1
(45) Date of Patent: Sep. 22, 2015

(54) THREE-DIMENSIONAL MOLDING EQUIPMENT

(71) Applicant: Matsuura Machinery Corporation, Fukui, Fukui (JP)

(72) Inventors: Yasunori Takezawa, Fukui (JP); Toshio Maeda, Fukui (JP); Toshihiko Kato, Fukui (JP); Koichi Amaya, Fukui (JP)

(73) Assignee: Matsuura Machinery Corporation, Fukui, Fukui (JP)

( * ) Notice: Subject to any disclaimer, the term of this patent is extended or adjusted under 35 U.S.C. 154(b) by 0 days.

(21) Appl. No.: 14/518,178

(22) Filed: Oct. 20, 2014

(30) Foreign Application Priority Data

Apr. 4, 2014 (JP) .................................. 2014-077409

(51) Int. Cl.
| | |
|---|---|
| *B29C 59/16* | (2006.01) |
| *B22F 3/105* | (2006.01) |
| *B28B 1/00* | (2006.01) |
| *B28B 17/00* | (2006.01) |
| *B33Y 30/00* | (2015.01) |
| *B33Y 50/02* | (2015.01) |

(52) U.S. Cl.
CPC .............. *B22F 3/1055* (2013.01); *B28B 1/001* (2013.01); *B28B 17/0081* (2013.01); *B33Y 30/00* (2014.12); *B33Y 50/02* (2014.12); *B22F 2003/1056* (2013.01); *B22F 2003/1057* (2013.01)

(58) Field of Classification Search
CPC ........... B22F 3/1055; B22F 2003/1056; B22F 2003/1057; B28B 17/0081; B28B 1/001
USPC ............................... 425/174.4, 385, 112, 375
See application file for complete search history.

(56) References Cited

U.S. PATENT DOCUMENTS

| | | | | |
|---|---|---|---|---|
| 7,048,528 | B2 * | 5/2006 | Ishikawa et al. | ............ 425/174.4 |
| 8,985,989 | B2 * | 3/2015 | Wu et al. | .................... 425/174.4 |

FOREIGN PATENT DOCUMENTS

| | | | |
|---|---|---|---|
| JP | 2003-181942 | A | 7/2003 |
| JP | 2005-336547 | A | 8/2005 |
| JP | 2005-336547 | A | 12/2005 |
| JP | 2008-111151 | A | 5/2008 |
| JP | 2009-006509 | A | 1/2009 |

* cited by examiner

*Primary Examiner* — Joseph S Del Sole
*Assistant Examiner* — Thukhanh T Nguyen
(74) *Attorney, Agent, or Firm* — Richard M. Goldberg

(57) ABSTRACT

Three-dimensional molding equipment includes powder supply equipment configured to supply powder material and form a powder layer, and a light beam scanning unit configured to radiate a light beam to the powder layer and move a radiated location thereof, where a three-dimensional shaped molding object is manufactured by alternately repeating processes of forming the powder layer and sintering the powder layer with light beam radiation. A region used for manufacturing the three-dimensional shaped molding object is divided into a plurality of divided regions such that respective divided regions have an equal-length molding path which is to be a scanning route of the beam such as having unequal-length molding parts by a scanning route of the beam, and radiation is executed by a plurality of the light beam scanning units to the respective plurality of divided regions to improve molding efficiency.

5 Claims, 4 Drawing Sheets

THREE-DIMENSIONAL MOLDING EQUIPMENT

TECHNICAL FIELD

The present invention relates to three-dimensional molding equipment that manufactures a three-dimensional shaped molding object by laminating and sintering powder material, and a method for manufacturing the three-dimensional shaped molding object.

BACKGROUND OF THE INVENTION

According to this kind of invention in related arts, a three-dimensional shaped molding object including a number of sintered layers is manufactured by repeating a process of supplying powder material from powder supply equipment to form a powder layer and a process of radiating a light beam or an electron beam to a predetermined region of the powder layer formed in the mentioned process to sinter the powder in the predetermined region.

Meanwhile, in the above-described related arts, a galvano scanner device is used to radiate the light beam or the electron beam in most cases. For example, Patent Document 1 of JP 2005-336547 A discloses an invention in which a light beam or an electron beam emitted from a laser oscillator (20) is reflected on a single galvano scanner device (scanner 22), and further radiated to a powder layer by changing a reflecting direction thereof. With this configuration, there are effects that a radiated location of the light beam or the electron beam can be moved fast by the galvano scanner device, and there is an effect of shortening molding time.

However, to sinter the powder material, high-energy radiation is required and the light beam or the electron beam is needed to be concentrated. Normally, the light beam or the electron beam used for sintering is 200 W laser, and the light beam is concentrated until a radiation diameter becomes 0.1 mm or less so as to increase energy. Since the radiation diameter is extremely small as described above, there is a problem in that it takes an extremely long time to manufacture a relatively large molding object even in the case of using the galvano scanner device.

In general, a surface of the three-dimensional molding object is required to have high hardness and density, but in many cases, the inside thereof is allowed to have relatively low hardness and density. Therefore, according to the related art, to shorten the molding time, energy density is lowered by, for example, upsizing the radiation diameter at the time of sintering the powder layer located on an inner side of the molding object, and the energy density is raised by downsizing the radiation diameter only at the time of sintering the powder layer located on an outline side of the molding object.

However, according to this related art, control tends to be complicated because the radiation diameter is needed to be changed and there are number of scanning patterns executed by the single galvano scanner device.

PRIOR ART DOCUMENT

Patent Document

Patent Document 1: JP 2005-336547 A

SUMMARY OF THE INVENTION

Problems to be Solved by the Invention

The present invention is made in view of the above-described situations, and an object of the present invention is to provide a configuration of three-dimensional molding equipment that can improve molding efficiency.

To solve the above-mentioned problems, a basic configuration according to the present invention includes three-dimensional molding equipment comprising: a powder supply equipment which includes a laminating process to form a powder layer; and a light beam or electron beam scanning unit which includes a sintering process to radiate a light beam or an electron beam to the powder layer and move a radiated location thereof to sinter the powder layer, wherein the laminating process and the sintering process are configured to alternately repeat, and a region used for manufacturing a three-dimensional shaped molding object is divided into a plurality of regions, and a plurality of the light beam or electron beam scanning units corresponding to each respective divided regions radiates to the plurality of divided regions, wherein the divided regions are formed such that respective divided regions have an equal-length molding path which is to be a scanning route of the light beam or the electron beam.

Effect of the Invention

Since the present invention is thus configured, the plurality of divided regions can be simultaneously sintered, thereby achieving to improve molding efficiency.

DETAILED DESCRIPTION

The basic configuration comprises: powder supply equipment configured to supply powder material to form a powder layer; and a light beam or electron beam scanning unit configured to radiate a light beam or an electron beam to the powder layer and move a radiated location thereof, wherein a region used for manufacturing the three-dimensional shaped molding object is divided into a plurality of regions, wherein the divided regions are formed such that respective divided regions have an equal-length molding path which is to be a scanning route of the light beam or the electron beam such as having unequal-length molding parts by a scanning route of the light beam or the electron beam, and a plurality of the light beam or electron beam scanning units corresponding to each respective divided regions radiates to the plurality of divided regions by alternately repeating of forming the powder layer and, sintering the powder layer by radiating the light beam or the electron beam with a three-dimensional molding equipment to manufacture a three-dimensional shaped molding object.

Here, the above-mentioned "region used for manufacturing the three-dimensional shaped molding object" includes, for example, a surface of a molding table on which the powder layers are laminated or a surface of the powder layer laminated on the molding table.

According to the above configuration, sintering can be simultaneously performed with respect to the plurality of divided regions by the plurality of light beam or electron beam scanning units. Therefore, sintering time per unit area can be shortened.

Figure 5:
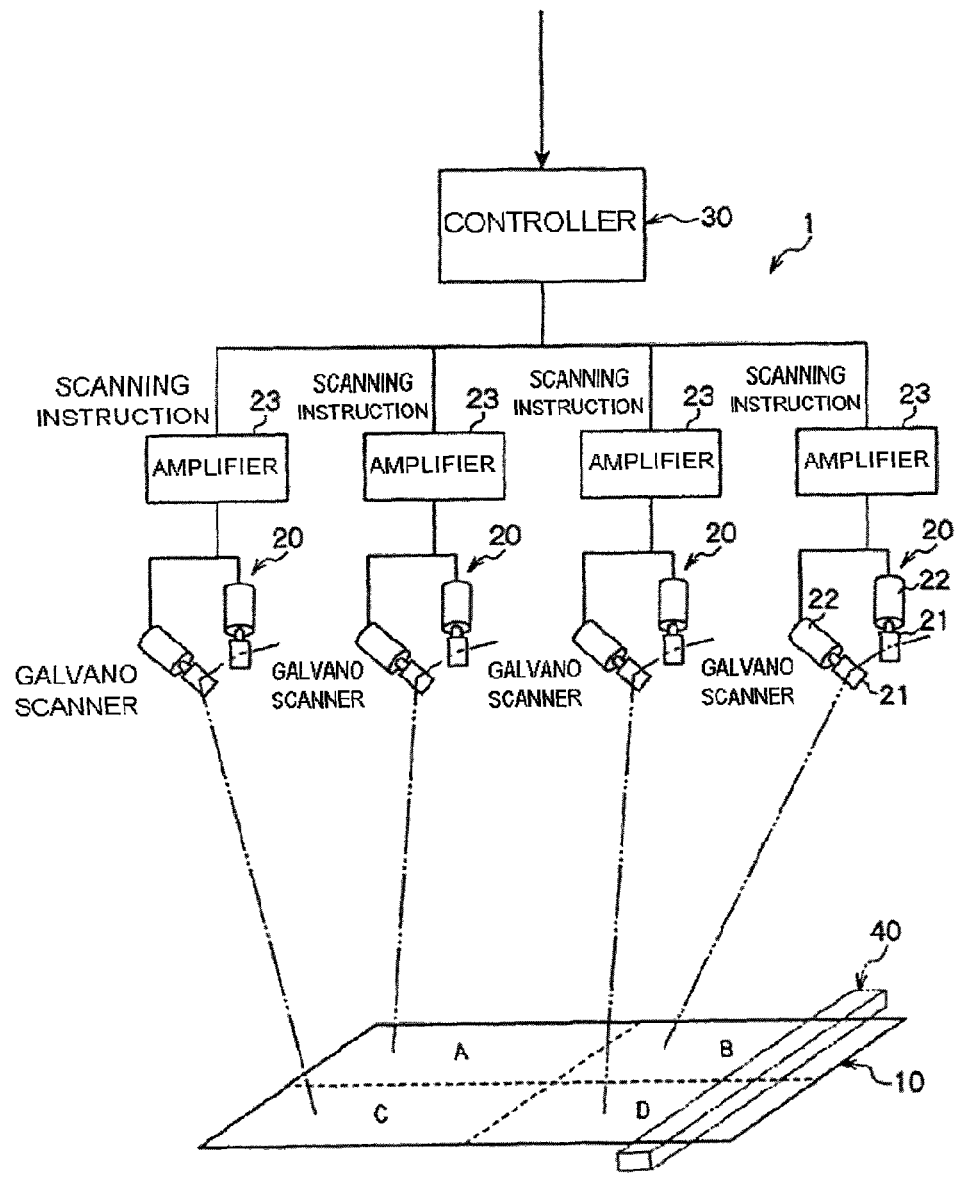
FIG. 5 is a perspective view schematically illustrating the fundamental principle of dividing a plurality of manufacturing regions of three-dimensional molding equipment.

As illustrated in FIG. 5, a three-dimensional molding equipment 1 includes a molding table 10 that can move vertically, a plurality of light beam or electron beam scanning units 20 disposed above the molding table 10, a controller 30 that controls vertical movement of the molding table 10, operation of the respective light beam or electron beam scanning units 20, etc., and powder supply equipment 40 that supplies powder material on the molding table 10. A three-dimensional shaped molding object is manufactured by alternately repeating a laminating process of supplying the powder material to form a powder layer, and a sintering process of radiating a light beam or an electron beam to the powder layer and moving a radiated location to sinter the powder layer.

The molding table 10 is a table having an upper surface formed flat, and configured to move vertically by an elevating mechanism not illustrated.

The molding table 10 moves downward by a predetermined amount every time of repeating the processes of forming the powder layer by the later-described powder supply equipment 40 and the light beam or electron beam scanning units 20, and partially sintering the powder layer.

Meanwhile, as a different example, the molding table 10 may be fixed not movable vertically, and the powder supply equipment 40 may be configured to move vertically.

The light beam or electron beam scanning unit 20 is a two-axis galvano scanner device in which the light beam or the electron beam radiated from a light beam or electron beam oscillator (not illustrated) is reflected by two reflection mirrors 21, 21 and radiated to the upper surface of the powder layer on the molding table 10, and further a radiated location thereof is moved in a planar direction.

The respective light beam or electron beam scanning units 20 make the two reflection mirrors 21, 21 rotate independently by motors 22, 22 respectively in response to a scanning instruction from the controller 30. When the mirrors are rotated, scanning is executed by the light beam or the electron beam to be radiated to the upper surface of the powder layer in XY directions by setting, as an origin, a reference position on the molding table 10 imaged by an imaging device (not illustrated) such as a CCD camera.

It should be noted that reference sign 23 in FIG. 5 indicates an amplifier that supplies amplified control voltage of the controller 30 to each of the light beam or electron beam scanning units 20.

Further, the light beam or electron beam oscillator includes, for example, the number of laser beam sources less than the number of the light beam or electron beam scanning units 20. A laser beam emitted from the laser light source may be divided by an optical unit such as a prism or a lens such that each light is radiated to the reflection mirror 21 of the light beam or electron beam scanning unit 20. Meanwhile, a different example of the light beam or electron beam oscillator may include a laser beam source for each of the plurality of light beam or electron beam scanning units 20.

The controller 30 is a control circuit including a storage unit that stores a processing program, processing data, etc., a CPU, an input/output interface, and so on, and may be formed of a micro-computer, a programmable controller, and other electronic circuits, for example.

The controller 30 receives data input including three-dimensional data (e.g., STL format data, etc.) generated by a CAD/CAM system not illustrated, data related to the radiation diameter of the light beam or the electron beam, radiation output of the light beam or the electron beam, and so on. Further, the controller 30 executes arithmetic processing based on the processing program which preliminarily stores the above-mentioned data, and controls the light beam or electron beam oscillator (not illustrated), the elevating mechanism (not illustrated) for the molding table 10, the plurality of light beam or electron beam scanning units 20, etc. in accordance with results of said arithmetic processing.

Changing the radiation diameter of the light beam or the electron beam can be achieved by adopting a convex lens or a concave lens.

Besides the above lenses, an aperture mechanism capable of changing a beam diameter can be adopted in an optical path of the light beam or the electron beam.

More specifically, the aperture mechanism may be provided with a mask plate including a plurality of diaphragm apertures having different diameters, and the plurality of diaphragm apertures may be configured to be selectively moved on the optical path of the light beam or the electron beam by moving the mask plate.

Further, the powder supply equipment 40 is a known device that forms a substantially flat powder layer by supplying and squeezing metallic or non-metallic powder material on the flat surface while moving horizontally. The powder supply equipment 40 is configured to move substantially in the horizontal direction above the molding table 10 to for in the powder layer on the upper surface of the molding table 10 and laminate additional powder layers over the formed powder layer.

First, the controller 30 actuates the powder supply equipment 40 based on the preliminarily stored processing program and forms the powder layer on the molding table 10. Subsequently, the controller 30 actuates the plurality of light beam or electron beam scanning units 20 to radiate the light beam or the electron beam to the upper surface of the powder layer.

Figure 6:
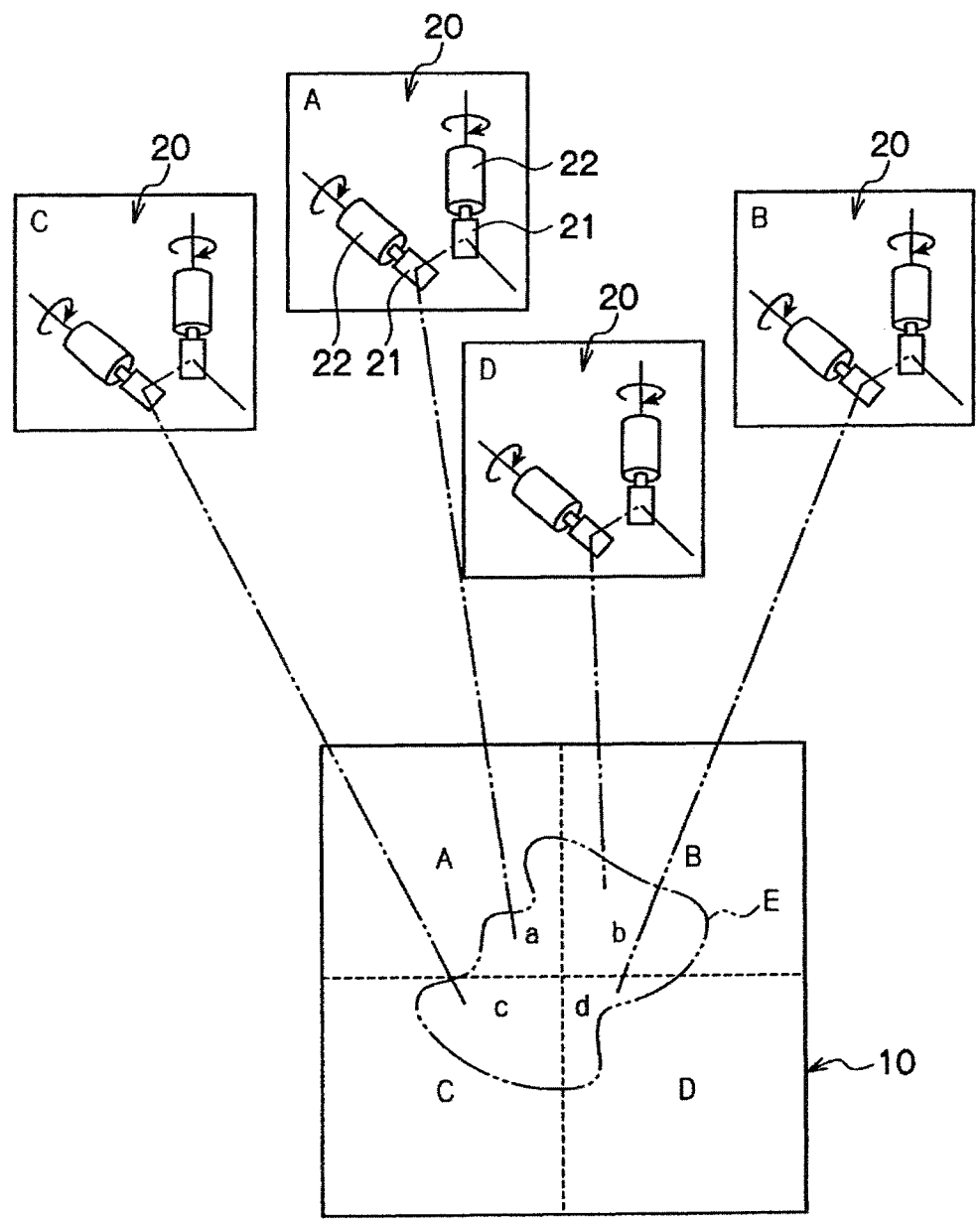
FIG. 6 is a schematic view illustrating relations between divided regions and a plurality of light beam or electron beam scanning units.

Explaining above basic configuration in detail, the controller 30 recognizes, as illustrated in FIG. 6, regions on the molding table 10 as a plurality of divided regions A, B, C and D each having substantially the same shape (square shape in the example of the drawing), and allocates the plurality of the light beam or electron beam scanning units 20 so as to correspond to the plurality of respective divided regions A, B, C and D on a one-to-one basis. Further, the controller 30 sets a region to be molded E which stretches over the plurality of divided regions A, B, C and D on the molding table 10 based on the three-dimensional data and the like.

The region to be molded E corresponds to a cross-section of a three-dimensional shaped molding object to be manufactured by the three-dimensional molding equipment 1 taken along a plane parallel to the molding table 10, and the shape of the region to be molded E may be varied by each of the plurality of the powder layers or may be the same in each of the plurality of the powder layers, depending on the shape of the three-dimensional shaped molding object.

The controller 30 controls the respective light beam or electron beam scanning units 20 to radiate the light beam or the electron beam to a region a (b, c or d) where the region to be molded E overlaps with the divided region A (B, C, or D) corresponding to each of the light beam or electron beam scanning units 20, and further move the radiated location along a predetermined molding path.

The molding path is a scanning route for the light beam or the electron beam, and is set based on the three-dimensional data and the like and stored in a predetermined storage area by the controller 30.

There are two kinds of molding paths: a vector molding path for scanning the region to be molded E along the contour thereof by the light beam or the electron beam; and a raster molding path for scanning an inner region of the region to be molded E by the light beam or the electron beam so as to hatch the mentioned region. The molding paths are set for the respective powder layers.

The raster molding path is set per region a (b, c or d). For example, the raster molding path may be a route formed of following two scanning routes alternately repeated: a linear scanning route directed from one end to the other end in the region a while the light beam or the electron beam is ON state; and a return scanning route directed from the other end of the linear scanning route to an offset position while the light beam or the electron beam is OFF state. Note that the raster molding path may be a different pattern other than the above-described pattern.

When scanning by the light beam or the electron beam is executed along the molding path as described above, the region to be molded E on the upper surface of the powder layer is sintered by heat of the light beam or the electron beam. After that, the controller 30 lowers the molding table 10 by the thickness of the powder layer, and a new powder layer is formed by the powder supply equipment 40 on the upper surface of the powder layer including the region to be molded E.

Subsequently, the controller 30 recognizes the upper surface of the new powder layer as the plurality of the divided regions A, B, C and D in the same manner in the process executed for the above-described first powder layer, and allocates the plurality of the light beam or electron beam scanning units 20 so as to correspond to the plurality of the divided regions A, B, C and D on a one-to-one basis, and then sets the region to be molded E stretching over the plurality of respective divided regions A, B, C and D on the upper surface of the new powder layer.

Next, the controller 30 controls the respective light beam or electron beam scanning units 20, thereby radiating the light beam or the electron beam to each region a (b, c, or d) where the region to be molded E overlaps with the divided region A (B, C or D) corresponding to each of the light beam or electron beam scanning units 20, and also moving the radiated location along the preliminarily set molding path to sinter the new powder layer, and further unifying the sintered portion to the sintered portion of the previous powder layer.

Afterward, a predetermined three-dimensional shaped molding object is manufactured by sequentially repeating the processes of lowering the molding table 10, forming the powder layer by the powder supply equipment 40, and sintering the powder layer by executing scanning with the light beam or the electron beam of the plurality of light beam or electron beam scanning units 20. Meanwhile, during the above processes, cutting process is applied to an outer peripheral portion of the sintered layer with high accuracy by using a cutting device not illustrated, if necessary.

Therefore, according to the three-dimensional molding equipment 1 having the above-described configuration, sintering can be simultaneously executed for the plurality of divided regions a, b, c and d by the plurality of the light beam or electron beam scanning units 20. As a result, the sintering time for each powder layer can be shortened, and furthermore, the sintering time for one entire three-dimensional shaped molding object can be greatly shortened, and molding efficiency can be improved.

Moreover, for example, in the case where a region to be molded E is sintered by a single light beam or electron beam scanning unit, a temperature difference may occur due to a time difference between beginning and ending of the scanning route, thereby causing shape deformation in the molding object such as warpage. However, according to the above-described three-dimensional molding equipment 1, such a time difference and temperature difference can be minimized and the shape deformation can be avoided because the plurality of the regions can be sintered at the same time.

Figure 4:
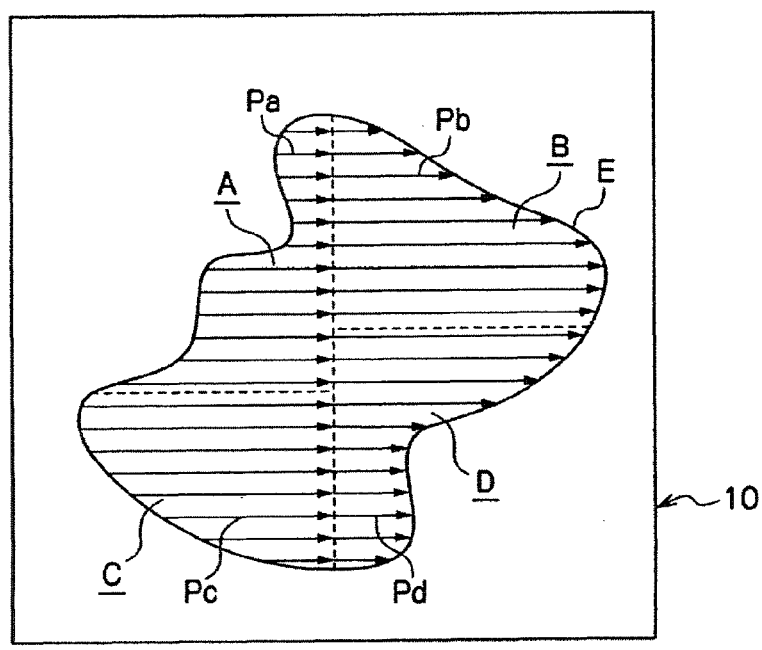
FIG. 4 is a plane view illustrating basic construction of this invention.

In said basic configuration, as is illustrated in FIG. 4, divided regions allocated with a plurality of light beam or electron beam scanning units 20 are defined as divided regions A, B, C and D each having an equal-length molding path including a vector molding path and a raster molding path. Note that interrupted lines in FIG. 4 indicate dividing lines.

In other words, a plurality of molding paths Pa, Pb, Pc and Pd is set for the plurality of divided regions A, B, C and D so as to correspond to the respective divided regions. The molding paths Pa, Pb, Pc and Pd are preliminarily calculated by a controller 30 with respect to respective powder layers to be laminated based on three-dimensional data and the like described above.

Among the plurality of molding paths Pa, Pb, Pc and Pd divided into a plurality of paths, a molding path (for example, Pa) that has an uneven contour of a region to be molded E has a long vector molding path along the uneven contour, and therefore, the molding path tends to be long even in the case where the region has relatively small area.

Therefore, according to the embodiment illustrated in FIG. 4, the plurality of molding paths Pa, Pb, Pc and Pd in the plurality of divided regions A, B, C and D may have the substantially same length. As a result, scanning by the plurality of light beam or electron beam scanning units 20 can be started substantially same time and finished at the substantially same time, and furthermore, molding efficiency is improved and shape deformation due to temperature difference or the like can be avoided.

Figure 1:
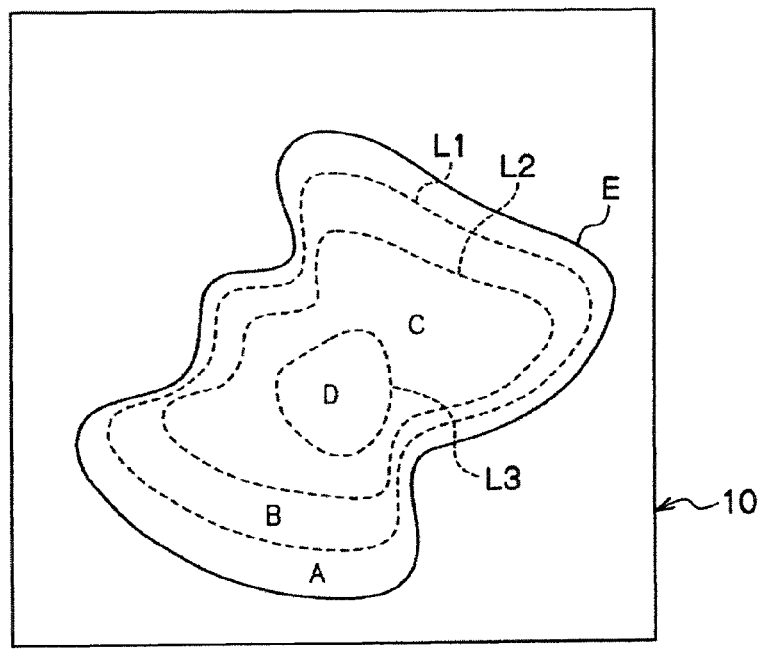
FIG. 1 is a plane view illustrating embodiment 1 and example 1.

According to a first embodiment, as is illustrated in FIG. 1, the light beam or electron beam scanning unit corresponding to a divided region close to the contour of a region to be molded.

In said first embodiment, the light beam or electron beam scanning unit corresponding to a divided region close to a center portion of the region to be molded are controlled such that a radiation amount per unit area becomes smaller as a position becomes closer to the center portion, or controlled such that the radiation amount per unit area becomes larger as the position becomes closer to the center portion.

By the way, the above-mentioned configuration "controlled such that the radiation amount per unit area becomes smaller as the position approaches to the center portion" may include, for example, an embodiment of increasing a radiation diameter of the light beam or the electron beam, and an embodiment of reducing output of a light beam or electron beam oscillator.

In the same manner, the above-mentioned configuration "controlled such that the radiation amount per unit area becomes larger as the position approaches to the center portion" may include, for example, an embodiment of reducing the radiation diameter of the light beam or the electron beam, and an embodiment of increasing the output of the light beam or electron beam oscillator. However, adoption of this kind of embodiment is exceptional.

According to this embodiment, the outer surface of the molding object and the inside of the molding object can be sintered at different density in a short time.

Figure 2:
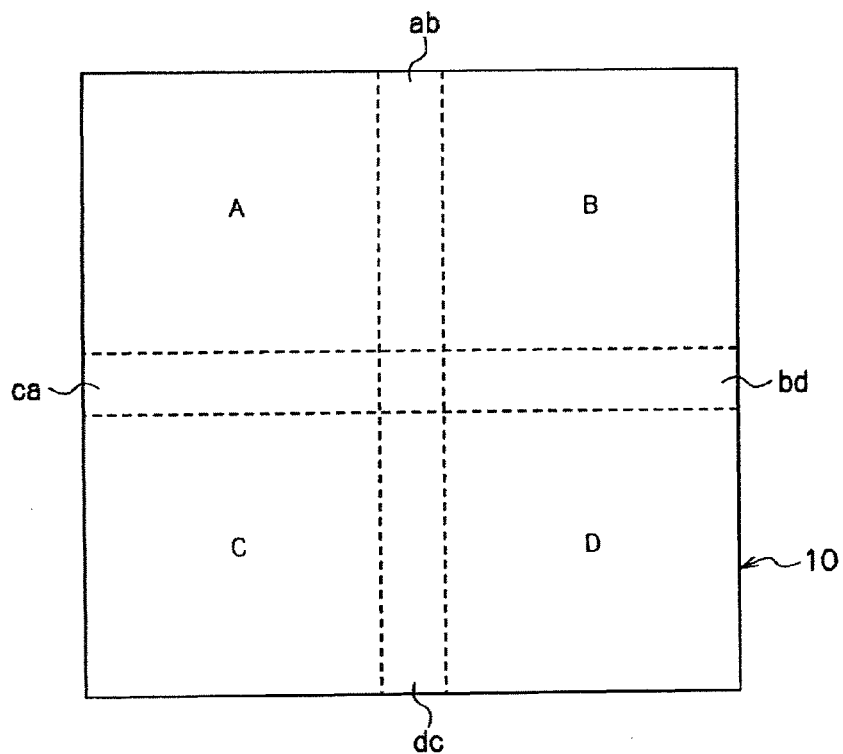
FIG. 2 is a plane view illustrating embodiment 2 and example 2.

According to a second embodiment, as is illustrated in FIG. 2, two light beam or electron beam scanning units corresponding to two adjacent divided regions are configured according to the first to fifth embodiments such that a radiated region of a light beam or an electron beam by one of the light beam or electron beam scanning units overlaps with the radiated region of a light beam or an electron beam by the other light beam or electron beam scanning unit, around a portion close to a boundary of the two divided regions.

According to this embodiment, it is possible to avoid formation of streak lines due to unevenness of sintering density between the adjacent divided regions caused by a gap generated between the adjacent divided regions at a contact portion of adjacent scanning lines because of a small error in the radiation diameter of the adjacent two light beams or two electron beams, or caused by small stripes generated between the adjacent scanning lines.

Figure 3:
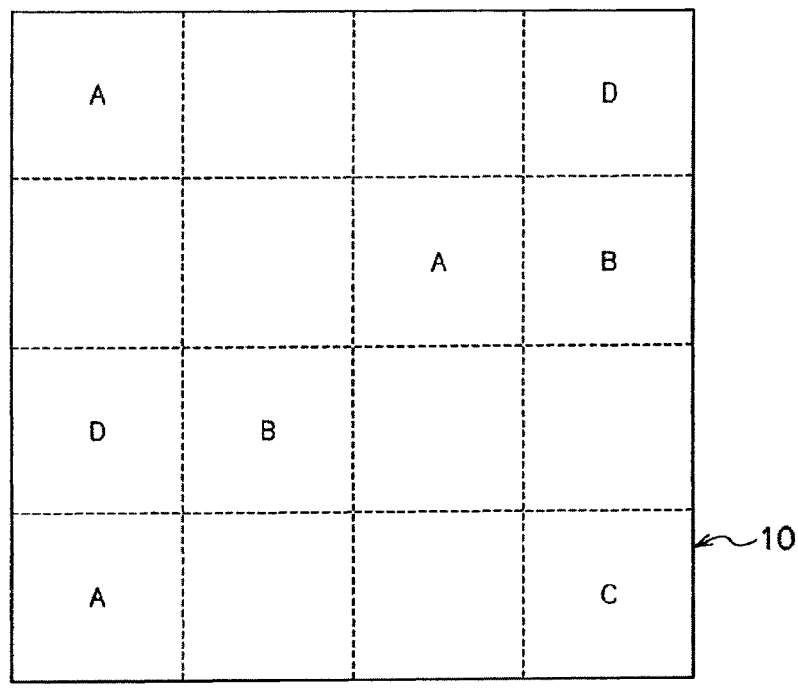
FIG. 3 is a plane view illustrating embodiment 3 and example 3.

According to a third embodiment, as is illustrated in FIG. 3, a number of divided regions is set larger than a number of light beam or electron beam scanning units according to the first to sixth embodiments.

Examples are explained as follows:

Example 1

According to a first embodiment illustrated in FIG. 1, a plurality of boundary lines L1, L2 and L3 each having an endless ring shape is formed on an upper surface of each of the powder layers, separated inward from a contour of a region to be molded E by different distances. The plurality of regions divided by these boundary lines L1, L2 and L3 is defined as a plurality of divided regions A, B, C and D allocated with a plurality of light beam or electron beam scanning units 20 (In FIG. 1, illustration with molding parts Pa, Pb, Pc, and Pd is omitted).

Further, according to this embodiment, a radiation amount per unit area of the light beam or electron beam scanning unit 20 corresponding to a divided region close to the contour of the region to be molded E is controlled to be different from the radiation amount per unit area of the light beam or electron beam scanning unit 20 corresponding to a divided region close to a center portion of the region to be molded E.

More specifically, a radiation diameter of a light beam or an electron beam corresponding to the divided region A closest to the contour is set smaller than radiation diameters of three other light beams or electron beams corresponding to other divided regions B, C and D.

Further, the radiation diameters of the three light beams or electron beams corresponding to other divided regions B, C and D are set the same.

Therefore, according to the embodiment in FIG. 1, molding efficiency is improved and shape deformation due to a temperature difference and the like can be avoided in the same manner as the above-described embodiments because sintering for the plurality of divided regions A, B, C and D is executed simultaneously. Furthermore, the divided region A located on the most outer side can be sintered at higher density than the divided regions B, C and D located on more inner side thereof. As a result, strength, quality, etc. of a finished three-dimensional shaped molding object can be improved.

Meanwhile, the plurality of boundary lines is set as illustrated in FIG. 1, but a single boundary line may be also set to form two divided regions as another example.

As illustrated in FIG. 1, widths between the adjacent boundary lines are set unequal, but the widths may be set equal as a different example.

Additionally, there is another different example in which the radiation diameters of the light beams or the electron beams corresponding to the divided regions B, C and D located on the inner side is gradually increased in the order, such that sintering may be executed at lower density as the position approaches to the center portion.

Furthermore, there is still another example in which the radiation diameters may be gradually reduced contrary to the above example, such that sintering may be executed at lower density as the position approaches to the outer portion.

Example 2

According to a second embodiment illustrated in FIG. 2, a plurality of the divided regions A, B, C and D are set, and two light beam or electron beam scanning units 20, 20 corresponding to two adjacent divided regions A and B (B and D, D and C, or C and A) are configured such that a radiated region of a light beam or an electron beam by one of the light beam or electron beam scanning units 20 overlaps with the radiated region of the light beam or the electron beam by the other light beam or electron beam scanning unit 20, at a portion close to a boundary of the two adjacent divided regions (In FIG. 2, illustration with molding parts Pa, Pb, Pc, and Pd is omitted).

In other words, as illustrated in FIG. 2, overlapped portions ab, bd, dc and ca in which the radiated regions of the light beam or the electron beam are overlapped are formed in the portion close to the boundary of the two adjacent divided regions A and B (B and D, D and C, or C and A).

Therefore, according to the embodiment illustrated in FIG. 2, unevenness of sintering formed like streak lines at a boundary between the divided regions A and B (B and D, D and C, or C and A) can be avoided. In other words, in the case where there is not the overlapped portions ab, bd, dc and ca, for example, there is possibility that the streak lines due to unevenness of sintering density may be formed at the boundary of the divided regions because of a small error in the radiation diameters of the two light beams or electron beams corresponding to the adjacent divided regions, a small clearance generated between the radiation diameters of the two light beams or electron beams corresponding to the adjacent divided regions, and so on. However, according to this embodiment, such problems can be reduced by the overlapped portions ab, bd, dc and ca.

Meanwhile, widths of the overlapped portions ab, bd, de and ca are set substantially equal according to the example illustrated in FIG. 2, but there is another preferable example of hardly forming streak lines or the like, in which the widths of the overlapped portions ab, bd, dc and ca may be suitably varied in a longitudinal direction orthogonal to the widths.

Example 3

According to a third embodiment illustrated in FIG. 3, the number of divided regions used for manufacturing a three-dimensional shaped molding object is set larger than the number of light beam or electron beam scanning units 20 (In FIG. 3, illustration with molding parts Pa, Pb, Pc, and Pd is omitted).

A plurality of divided regions A, B, C and D, the number of which is larger than the number of the light beam or electron beam scanning units 20, is suitably allocated with the mentioned plurality of the light beam or electron beam scanning units 20 (four in an example in FIG. 3).

According to the example in FIG. 3, each of three divided regions A, two divided regions B, one divided region C, and two divided regions D is allocated with one of the light beam or electron beam scanning units 20. It should be noted that regions not indicated by the reference sign in FIG. 3 are not allocated with any of the light beam or electron beam scanning units 20.

Therefore, according to Example 3, in the case where a shape in a planar direction is complex, more various molding can be executed, such as by effectively sintering respective portions, forming portions sintered at different densities in the planar direction by changing a radiation diameter of the light beam or the electron beam depending on the divided regions, and so on.

APPLICABILITY OF THE INVENTION

In the three-dimensional molding equipment according to the present invention, effective molding can be executed by dividing a molding region into a plurality of regions, and the invention has a great deal of potential in industry.

EXPLANATION OF REFERENCE NUMERALS

10: molding table
20: light beam or electron beam scanning unit
30: controller
40: powder supply equipment
A,B,C,D: divided region
E: region to be molded
L1,L2,L3: boundary line
Pa,Pb,Pc,Pd: molding path
ab,bd,dc,ca: overlapped portion

What is claimed is:

1. Three-dimensional molding equipment comprising:
   a powder supply equipment which includes a laminating device to form a powder layer;
   a plurality of beam scanning units, each of which uses one of a light beam and an electron beam, and
   a control unit which:
      divides a region used for manufacturing a three-dimensional shaped molding object into a plurality of divided regions,
      controls said beam scanning units on a one-to-one-basis in a sintering process to radiate said one of a light beam and an electron beam to the powder layer,
      simultaneously moves a radiated location of each one of the light beam and the electron beam to sinter the powder layer in a laminating process to a corresponding one of the respective divided regions,
      alternately repeats the laminating process and the sintering process,
      forms the divided regions such that respective ones of the divided regions have an equal-length molding path which is to be a scanning route of the respective one of the light beam and the electron beam and such that the molding path includes both:
         a raster molding path for scanning an inner region and
         a vector molding path for scanning a region to be molded along a contour region.

2. The three-dimensional molding equipment according to claim 1, wherein at least one boundary line shaped in an endless ring and separated inward from an outer contour of a region to be molded is set on a surface of the powder layer, and the divided region is a plurality of regions divided by the at least one boundary line.

3. The three-dimensional molding equipment according to claim 2, wherein the control unit controls the beam scanning unit corresponding to a divided region close to the outer contour of the region to be molded, and the beam scanning unit corresponding to a divided region close to a center portion of the region to be molded such that one of:
   a radiation amount per unit area becomes smaller as a position becomes closer to the center portion, and
   the radiation amount per unit area becomes larger as the position becomes closer to the center portion.

4. The three-dimensional molding equipment according to claim 1, wherein the control unit controls two beam scanning units corresponding to two adjacent divided regions such that a radiated region of a beam by one of the beam scanning units overlaps with the radiated region of a beam by the other beam scanning unit, around a portion close to a boundary of the two divided regions.

5. The three-dimensional molding equipment according to claim 1, wherein the control unit sets a number of divided regions to be larger than a number of beam scanning units.

* * * * *